T. MERRELL.
Corn-Harvesters.
No. 133,327.
Patented Nov. 26, 1872.
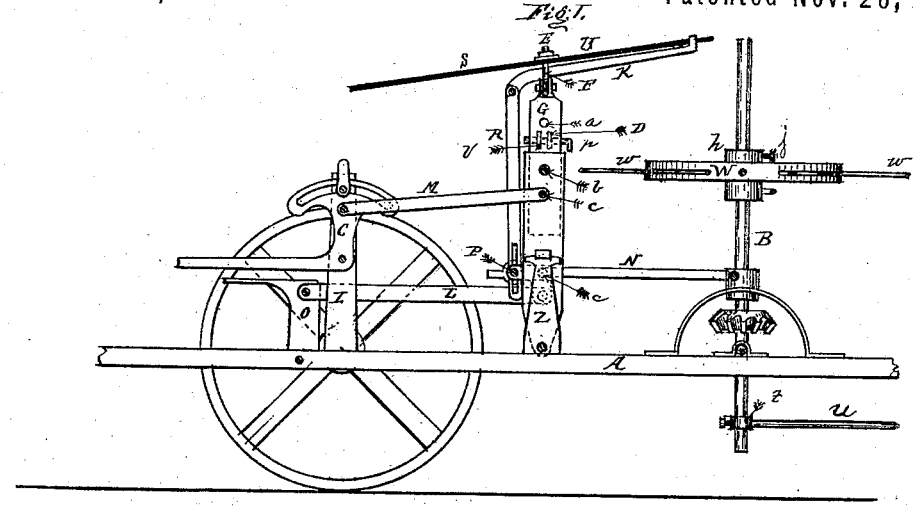
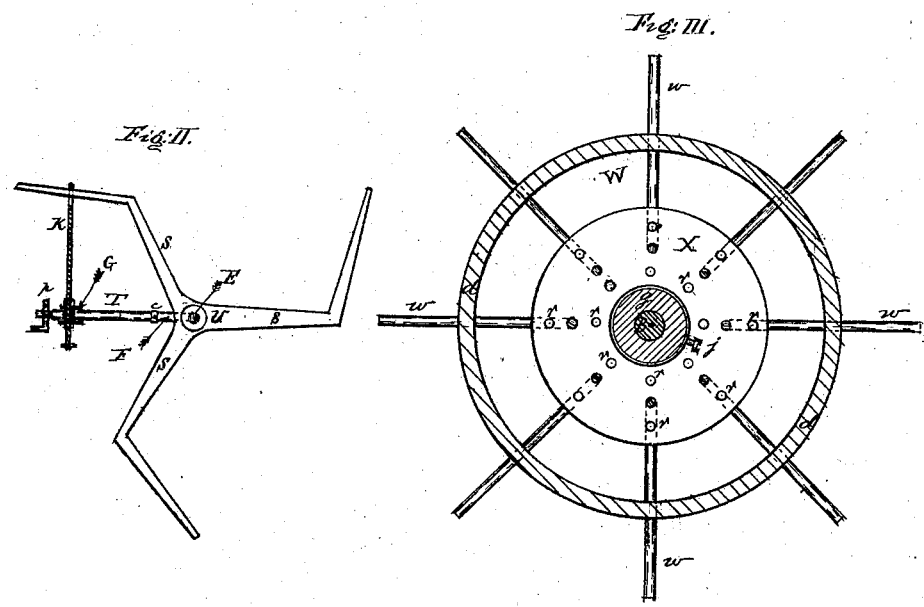

UNITED STATES PATENT OFFICE.

THEODORE MERRELL, OF DIXON, ILLINOIS, ASSIGNOR OF ONE-HALF HIS RIGHT TO LEWIS C. ELLSWORTH, OF DENVER, COLORADO TERRITORY.

IMPROVEMENT IN CORN-HARVESTERS.

Specification forming part of Letters Patent No. 133,327, dated November 26, 1872.

*To all whom it may concern:*

Be it known that I, THEODORE MERRELL, of Dixon, Lee county, State of Illinois, have invented certain Improvements in Corn-Harvesters, of which the following is a specification:

The object of my present improvements is to further perfect the construction and working of corn-harvesters, for which Letters Patent No. 124,757, dated March 19, 1872, were granted to me.

Figure I is a side view of a corn-harvester embodying my invention. Fig. II is a detached plan view of the dropper. Fig. III is a detached plan view of the circular disk.

The arms s s s of the stalk-receiving dropper U are supported by the hinged arm T. This arm may be raised or lowered, as may be required, being attached to a standard, G, in which holes a a and the bolt b are inserted. The standard G is also hinged at its lower end to a support, Z, which is bolted to the frame A. To this standard are attached two rods, M and N, with bolts c c. One of these rods is attached to the gear-shaft B, the other to a lever, C, hinged to the standard I, to enable the operator to move the standard G and shaft B, or its members, at once, as may be necessary, when on rolling or hilly ground. K is a catch connecting with the treadle O by means of rods R and L, connecting with the arm P. The lower end of the rod R is slotted, and extends below its connection with the arm P for adjusting the catch K. The axle E which the arms s s s revolve on is attached to a separate piece, F, which is attached to arm T by a bolt, e, to give the said arms the required inclination.

By this arrangement the stalk-receiver, when so desired, can be moved up over the machine out of the way by raising the hinged arm T and fastening the same by a key-bolt, p, through the ear-pieces D and V on the standard G. The stalks and cane will also find a better lodgment on account of their long stiff leaves, and the arms can be brought closer to the work than wings, which would interfere with the fingers on the gatherer on the circular disk.

By referring back to the above-mentioned patent it will be found that the fingers on the circular disk are attached to the same by eyebolts. Experience has proved this to be objectionable, because they require too long time to be adjusted, and are liable to move and become loose when at work. In order to overcome this difficulty the fingers w, through the outer rim d of the disk W, are extended, and also the hub g is extended to receive a plate, X, with the hub h and set-screws j to move on the outer surface of the first hub, and is tightened to the same by the set-screw j. The plate X has holes r to receive the fingers w and allow the same to be extended or shortened. Said fingers rest on the rim or bearings d. By this arrangement no nuts or keys are required to hold the fingers in the required position; all that is required is the set-screw on the hub of the plate, enabling the operator to adjust the plate and fingers in a moment. The simplicity and cheapness of this arrangement over the former in the patent referred to are apparent.

In order to prevent the stalks from falling in front of the knife after they are cut, I extend the gear-shaft B below the frame A to hold a hub, t, to which are attached one or more arms or elastic wires or springs, u.

Having thus fully described my invention, I desire to claim—

1. The dropper U, provided with arms s s, hinged arm T, catch K, and piece F, in combination with the standards G and I, gear-shaft B, rods N, M, R, and L, lever C, treadle O, and frame A, substantially as and for the purpose set forth.

2. The circular disk W, with a rim, d, hubs g and h, in combination with the plate X, fingers w, set-screw j, and gear-shaft B, substantially as and for the purpose set forth.

3. The elastic wires u and hub t, in combination with the gear-shaft B, substantially as and for the purpose set forth.

THEODORE MERRELL.

Witnesses:
 DANIEL B. MCKENNY,
 WILLIAM J. MOORE.